United States Patent
Hennenfent

(10) Patent No.: US 8,279,707 B2
(45) Date of Patent: Oct. 2, 2012

(54) FUSING GEOPHYSICAL DATA REPRESENTING A GEOPHYSICAL SPACE

(75) Inventor: Gilles Hennenfent, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 403 days.

(21) Appl. No.: 12/766,355

(22) Filed: Apr. 23, 2010

(65) Prior Publication Data

US 2011/0261648 A1    Oct. 27, 2011

(51) Int. Cl.
 *G01V 1/00* (2006.01)
(52) U.S. Cl. .............................. 367/38; 367/59; 702/14
(58) Field of Classification Search .................... 367/38, 367/59; 702/14
See application file for complete search history.

(56) References Cited

U.S. PATENT DOCUMENTS

| 2010/0212909 A1* | 8/2010 | Baumstein et al. | 166/369 |
| 2011/0213556 A1* | 9/2011 | Yu et al. | 702/14 |

OTHER PUBLICATIONS

Du, Vachon, & Van Der Sanden, Satellite Image Fusion with Multiscale Wavelet Analysis for Marine Applications: Preserving Spatial Information and Minimizing Artifacts (PSIMA), Canadian Journal of Remote Sensing, Feb. 2003, vol. 29 No. 1, Ontario, Canada.

Nencini, Garzelli, Baronit, & Alparon, Remote Sensing Image Fusion Using the Curvelet Transform, Science Direct, 2007, 143-156.

Choi, Kim, Kim, The Curvelet Transform for Image Fusion, SaTRec, 2004, Republic of Korea.

Choi, A New Intensity-Hue-Saturation Fusion Approach to Image Fusion with a Tradeoff Parameter, IEEE Transactions on Geoscience and Remove Sensing, 2006 vol. 44 No. 6.

Ma, Ma & Shen, Pixel Fused Based Curveletes and Wavelets Denoise Algorithm, International Association of Engineers vol. 14 No. 2, China.

Choi, Kim, Nam & Choi, Fusion of Multispectral and Panchromatic Satellite Images Using the Curvelet Transform, IEEE Geoscience and Remote Sensing Letters, Apr. 2005, vol. 2 No. 2.

\* cited by examiner

*Primary Examiner* — Mark Hellner
(74) *Attorney, Agent, or Firm* — Marie L. Clapp

(57) ABSTRACT

Geophysical data representing at least first and second overlapping geophysical spaces may be aggregated. A first set of geophysical data representing the first geophysical space and a second set of geophysical data representing the second geophysical space may be obtained. The second set of geophysical data may be separate and discrete from the first set of geophysical data. The first set of geophysical data may be transformed from a first parametric domain to a third parametric domain, while the second set of geophysical data may be transformed from a second parametric domain to the third parametric domain. The first set of geophysical data may be fused with the second set of geophysical data in the third parametric domain to create a fused set of geophysical data. The fused set of geophysical data may be transformed from the third parametric domain to a fourth parametric domain.

23 Claims, 5 Drawing Sheets

FUSING GEOPHYSICAL DATA REPRESENTING A GEOPHYSICAL SPACE

FIELD OF THE INVENTION

The invention relates to aggregating geophysical data representing a geophysical space.

BACKGROUND OF THE INVENTION

Conventionally, datasets such as geophysical datasets are combined to improve the signal-to-noise ratio, thus accentuating salient (i.e., prominent or conspicuous) features therein. Oftentimes, dataset stacking is implemented for such combination. Stacking involves adding datasets together. In stacked datasets, however, salient features contained in only some of the datasets are accentuated to a lesser degree relative to salient features contained in all of the datasets.

SUMMARY

One aspect of the invention relates to a method of aggregating geophysical data representing at least first and second overlapping geophysical spaces. The method may be implemented via one or more computer processors operatively linked with a computer readable medium encoded with instructions executable by the processor. The method may include obtaining from a data storage system in communication with the computer processor a first set of geophysical data representing the first geophysical space. The first set of geophysical data may have data values for parameters of a first parametric domain that characterize the first geophysical space. The first parametric domain may be indexed by a first index that travels through the size of the first parametric domain. The method may also include obtaining, from the storage system, a second set of geophysical data representing the second geophysical space. The second set of geophysical data may have data values for parameters of a second parametric domain. The second parametric domain may be indexed by a second index that travels through the size of the second parametric domain. The second set of geophysical data may be separate and discrete from the first set of geophysical data. The method may further include transforming, via the executable instructions, the first set of geophysical data from the first parametric domain to a third parametric domain. The third domain may be indexed by a third index that travels through the size of the third parametric domain. The third index of the third parametric domain may be different from the first index of the first parametric domain and the second index of the second parametric domain. Transforming, via the executable instructions, the second set of geophysical data from the second parametric domain to the third parametric domain may be included in the method. Additionally, the method may include fusing, via the executable instructions, the first set of geophysical data with the second set of geophysical data in the third parametric domain to create a fused set of geophysical data that specifies data values for parameters of the third parametric domain for the third index of the third parametric domain. For a given index value included in the third index of the third parametric, the performance of the fusion of the first set of geophysical data with the second set of geophysical data may include: (a) selecting one of (i) the data value specified by the first set of geophysical data for a first parameter in the third parametric domain at the given index value, or (ii) the data value specified by the second set of geophysical data for the first parameter at the given index value; and (b) including the selected data value in the fused set of geophysical data as the data value for the first parameter at the given index value. The method may, in addition, include transforming, via the executable instructions, the fused set of geophysical data from the third parametric domain to a fourth parametric domain. The fourth parametric domain may be indexed by location.

Another aspect of the invention relates to a system configured to aggregate geophysical data representing a geophysical space. The system may include one or more processors configured to execute computer program modules. The computer program modules may include a data module, a transform module, and/or a fusion module. The data module may be configured to obtain sets of geophysical data representing a geophysical space from electronic storage. The sets of geophysical data may be discrete from each other and provide separate representations of the geophysical space. A given set of geophysical data may have data values for parameters of a corresponding initial parametric domain indexed by an initial index that travels over the size of the parametric domain corresponding to the given set of geophysical data. The transform module may be configured to transform the individual sets of geophysical data from the initial parametric domains of the individual sets of geophysical data to a transform parametric domain such that after transformation of the given set of geophysical data. The given set of geophysical data may have data values for parameters of the transform parametric domain indexed by a transform index that runs through the transform parametric domain. The fusion module may be configured to fuse the sets of geophysical data in the transform parametric domain to create a fused set of geophysical data that has data values for parameters of the transform parametric domain for the index. Responsive to the sets of geophysical data including a first set of geophysical data and a second set of geophysical data, the fusion module may be configured to fuse the first set of geophysical data and the second set of geophysical data at a given index value in the index of the transform parametric domain by: (a) selecting one of (i) the data value specified by the first set of geophysical data for a first parameter in the second parametric domain for the given index value, or (ii) the data value specified by the second set of geophysical data for the first parameter for the given index value; and (b) including the selected data value in the fused set of geophysical data as the data value for the first parameter for the given index value. The transform module may be further configured to transform the fused set of geophysical data from the transform parametric domain to a final parametric domain such that after being transformed the fused set of geophysical data has data values for parameters of the transform parametric domain indexed by a final index that runs through the final parametric domain.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
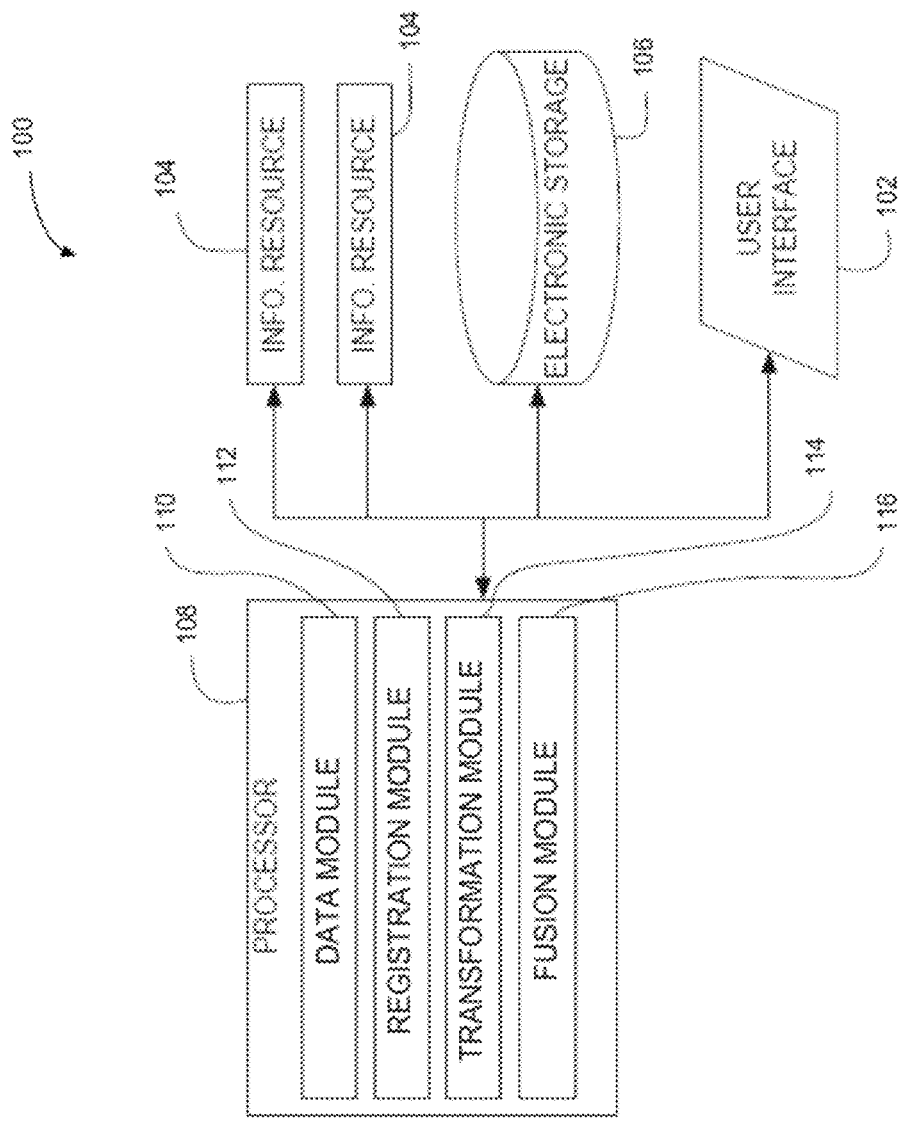
FIG. 1 illustrates an exemplary system configured to aggregate geophysical data representing a geophysical space.

FIG. 1 illustrates an exemplary system 100 configured to aggregate geophysical data representing a geophysical space. Embodiments of the present invention allow different datasets to be fused together into a single fused dataset such that salient features contained in different datasets are simultaneously visible, while preserving their respective amplitudes. That is, the fused dataset contains true-amplitude, coherent information present in one or more of the different datasets, but not necessarily each dataset. It is noteworthy that, while the present technology is described in the context of geophysical data, the concepts may be applied in any field where data is aggregated such as, for example, medical imaging, remote sensing, and navigation aid in aviation. As depicted in FIG. 1, the system 100 includes a user interface 102, one or more information resources 104, electronic storage 106, and a processor 108. The system 100 may include one or more additional components that are not necessary in describing the present technology.

The user interface 102 is configured to provide an interface between the system 100 and a user through which the user may provide information to and receive information from the system 100. This enables data, results, and/or instructions and any other communicable items, collectively referred to as "information," to be communicated between the user and the system 100. As used herein, the term "user" may refer to a single individual or a group of individuals who may be working in coordination. Examples of interface devices suitable for inclusion in the user interface 102 include a keypad, buttons, switches, a keyboard, knobs, levers, a display screen, a touch screen, speakers, a microphone, an indicator light, an audible alarm, and a printer. In one embodiment, the user interface 102 actually includes a plurality of separate interfaces.

It is to be understood that other communication techniques, either hard-wired or wireless, are also contemplated by the present invention as the user interface 102. For example, the present invention contemplates that the user interface 102 may be integrated with a removable storage interface provided by the electronic storage 106. In this example, information may be loaded into the system 100 from removable storage (e.g., a smart card, a flash drive, a removable disk, etc.) that enables the user(s) to customize the implementation of the system 100. Other exemplary input devices and techniques adapted for use with the system 100 as the user interface 102 include, but are not limited to, an RS-232 port, RF link, an IR link, modem (telephone, cable or other). In short, any technique for communicating information with the system 100 is contemplated by the present invention as the user interface 102.

The information resources 104 include one or more sources of information related to the geological space of interest and/or the process of generating an earth model of the geological space of interest. By way of non-limiting example, one of the information resources 104 may include seismic data acquired at or near the geological space of interest, information derived therefrom, and/or information related to the acquisition. The seismic data may include individual traces of seismic data, or the data recorded at on one channel of seismic energy propagating through the geological space of interest from a source. The information derived from the seismic data may include, for example, a velocity model, beam properties associated with beams used to model the propagation of seismic energy through the geological space of interest, Green's functions associated with beams used to model the propagation of seismic energy through the geological space of interest, and/or other information. Information related to the acquisition of seismic data may include, for example, data related to the position and/or orientation of a source of seismic energy, the positions and/or orientations of one or more detectors of seismic energy, the time at which energy was generated by the source and directed into the geological space of interest, and/or other information.

In one embodiment, the electronic storage 106 comprises electronic storage media that electronically stores information. The electronic storage media of the electronic storage 106 may include system storage that is provided integrally (i.e., substantially non-removable) with the system 100 and/or removable storage that is removably connectable to the system 100 via, for example, a port (e.g., a USB port, a firewire port, etc.) or a drive (e.g., a disk drive, etc.). The electronic storage 106 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 106 may store software algorithms, information determined by the processor 108, information received via the user interface 102, information received from the information resources 104, and/or other information that enables the system 100 to function properly. The electronic storage 106 may be a separate component within the system 100, or the electronic storage 106 may be provided integrally with one or more other components of the system 100 (e.g., the processor 108).

The processor 108 is configured to provide information processing capabilities in the system 100. As such, the processor 108 may include one or more of a digital processor, an analog processor, a digital circuit designed to process information, an analog circuit designed to process information, a state machine, and/or other mechanisms for electronically processing information. Although the processor 108 is shown in FIG. 1 as a single entity, this is for illustrative purposes only. In some implementations, the processor 108 may include a plurality of processing units. These processing units may be physically located within the same device or computing platform, or the processor 108 may represent processing functionality of a plurality of devices operating in coordination.

As is shown in FIG. 1, the processor 108 may be configured to execute one or more computer program modules. The one or more computer program modules may include one or more of a data module 110, a registration module 112, a transform module 114, a fusion module 116, and/or other modules. The processor 108 may be configured to execute the modules 110, 112, 114, and/or 116 by software; hardware; firmware; some combination of software, hardware, and/or firmware; and/or other mechanisms for configuring processing capabilities on the processor 108.

It should be appreciated that although the modules 110, 112, 114, and 116 are illustrated in FIG. 1 as being co-located within a single processing unit, in implementations in which the processor 108 includes multiple processing units, one or more of the modules 110, 112, 114, and/or 116 may be located remotely from the other modules. The description of the functionality provided by the different modules 110, 112, 114, and/or 116 described below is for illustrative purposes, and is not intended to be limiting, as any of the modules 110, 112, 114, and/or 116 may provide more or less functionality than is described. For example, one or more of the modules 110, 112, 114, and/or 116 may be eliminated, and some or all of its functionality may be provided by other ones of the modules 110, 112, 114, and/or 116. As another example, the processor 108 may be configured to execute one or more additional modules that may perform some or all of the functionality attributed below to one of the modules 110, 112, 114, and/or 116.

The data module 110 may be configured to obtain sets of geophysical data representing a geophysical space from electronic storage (e.g., the electronic storage 106) or other information source (e.g., the information resources 104). The sets of geophysical data are discrete from each other and provide separate representations of the geophysical space. For example, the obtained sets of geophysical data may have been acquired using different acquisition techniques and/or represent different aspects of the geophysical space (e.g., velocity, reflectivity, etc.). The obtained sets of geophysical data may have been acquired at different times. Prior to processing by other modules (e.g., the modules 112, 114, and/or 116), the obtained sets of geophysical data may have been processed with different techniques. The sets of geophysical data may include one or more sets of seismic data. The sets of geophysical data may be the same or different in size. In exemplary embodiments, a given set of geophysical data has data values for parameters of a corresponding initial parametric domain indexed by an initial index that travels over the size of the parametric domain corresponding to the given set of geophysical data.

By way of non-limiting example, the data sets acquired or otherwise utilized by exemplary implementations may include one or more of vintage and/or recent datasets processed using the same and/or different processing workflows; wavefields and/or reflectivities from one or more azimuths; products (e.g., reflectivities, wavefields, velocity models, attributes, etc.) derived from the same input datasets using different processing workflows (e.g., migrated datasets using two or more imaging algorithms, final products from third parties, etc.); wavefields prior to prediction attenuation (e.g., multiples predicted by SRME, time shift, and or other methods; groundroll predicted by modeling and/or an interferometric method; etc.) and wavefields, attributes, and/or properties derived therefrom; reflectivities, attributes, and/or properties derived from seismic, edge, and/or curvature datasets; electromagnetic datasets; gravitational datasets; and/or other geophysical information.

The registration module 112 may be configured to align the sets of geophysical data obtained by the data module 110 responsive to the sets of geophysical data being misaligned. Misalignment between the sets of geophysical data may arise when corresponding corners of the sets of geophysical data do not contain corresponding data, when the sets of geophysical data are of different dimensions or scales, and/or when the sets of geophysical data are otherwise misaligned. As such, aligning the sets of geophysical data one or more of shifting, skewing, scaling, rotating, rubber-sheeting, and/or other processing techniques. The alignment of the sets of geophysical data may be based on amplitude and/or phase of data contained in the sets of geophysical data. For example, the alignments of the sets of geophysical data may include correlating one or more corresponding salient features between the sets of geophysical data obtained by the data module 110, wherein the corresponding salient features are determined based on the amplitude of data contained in the sets of geophysical data at those salient features.

The transform module 114 may be configured to transform the individual sets of geophysical data obtained by the data module 110. According to exemplary embodiments, the individual sets of geophysical data are transformed from the initial parametric domains of the individual sets of geophysical data to a transform parametric domain. Such transform may include one or more of a Radon transform, a wavelet transform, a curvelet transform, a wave atom transform, a bandelet transform, a beamlet transform, a contourlet transform, a directionlet transform, a edgelet transform, a seislet transform, a shearlet transform, or a surfacelet transform, and/or other transform. After transformation of the given set of geophysical data, the given set of geophysical data may have data values for parameters of the transform parametric domain indexed by a transform index that runs through the transform parametric domain.

The fusion module 116 may be configured to fuse the sets of geophysical data in the transform parametric domain to create a fused set of geophysical data that has data values for parameters of the transform parametric domain for the index. In exemplary embodiments, responsive to the sets of geophysical data including a first set of geophysical data and a second set of geophysical data, the fusion module 116 is configured to fuse the first set of geophysical data and the second set of geophysical data at a given index value in the index of the transform parametric domain by selecting one of (i) the data value specified by the first set of geophysical data for a first parameter in the second parametric domain for the given index value, or (ii) the data value specified by the second set of geophysical data for the first parameter for the given index value. The fusion module 116 may be configured to perform such a selection using a selection rule. The selection rule may effectuate selection of the value with the greatest magnitude, the value with the greatest value, or a value based on some other metric. In some embodiments, the user interface 102 receives a user selection and/or specification of the selection rule. The application of the selection rule may be responsive to the reception of such selection and/or specification. The fusion module 116 may be configured to fuse the first set of geophysical data and the second set of geophysical data at the given index value in the index of the transform parametric domain by including the selected data value in the fused set of geophysical data as the data value for the first parameter for the given index value. In implementations in which three or more dataset are fused (or are involved in the fusion process), a selection rule may be collaborative. For example, a coefficient of a first dataset may be selected when a certain percentage of the other datasets are within a specified tolerance of the coefficient of the first dataset. In some implementations, a user may construct one or more new selections rules via the user interface 102. Such new selection rules may be based on building blocks, instructions, and/or other factors.

Figure 2:
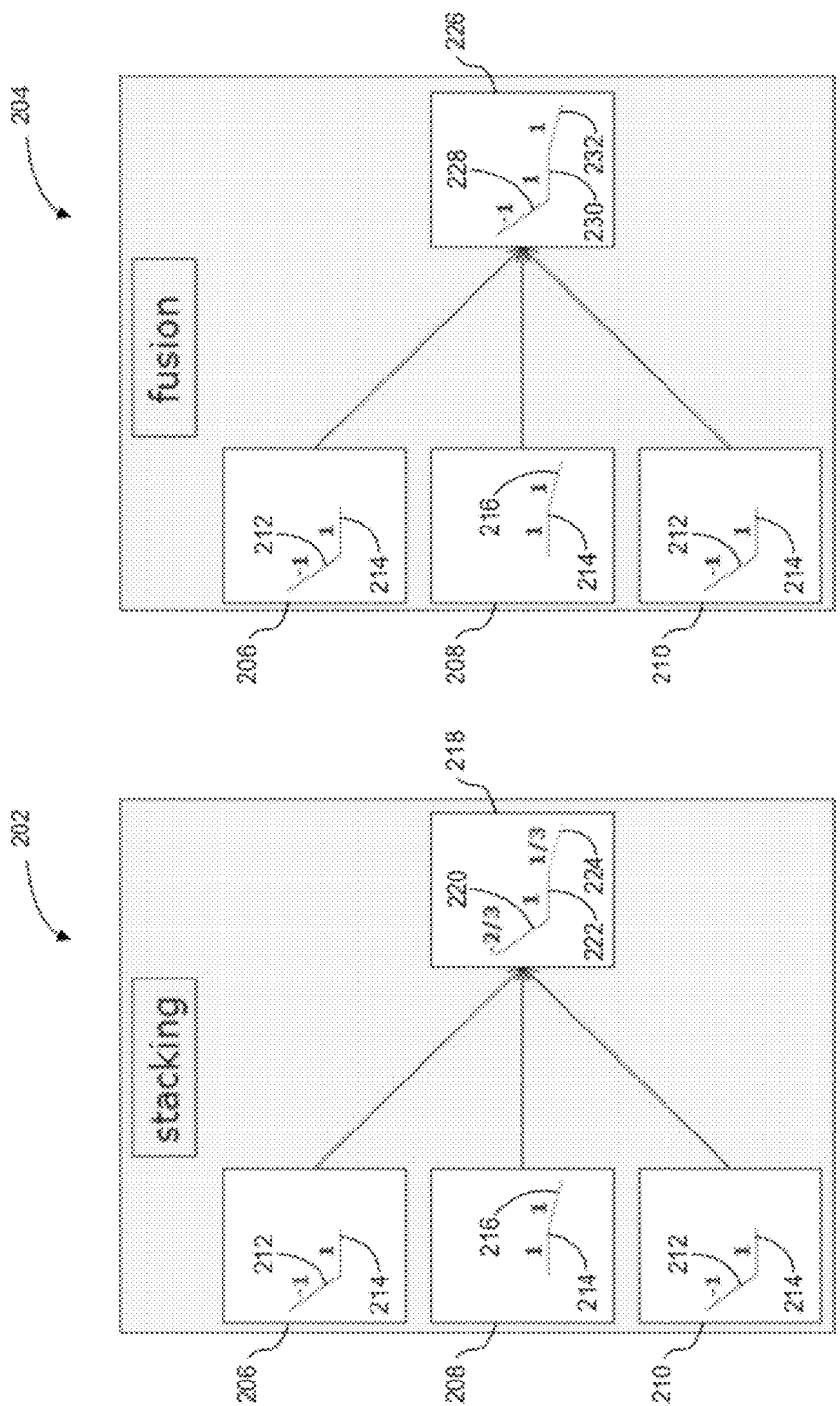
FIG. 2 illustrates a conceptual comparison between stacking datasets and fusing datasets in accordance with one or more embodiments of the present invention.

FIG. 2 illustrates a conceptual comparison between stacking datasets in panel 202 and fusing datasets in panel 204 in accordance with one or more embodiments of the present invention. Both panels 202 and 204 begin with dataset 206, dataset 208, and dataset 210. For purposes of illustration, the data included in datasets 206, 208, and 210 may be assumed to be zero, unless otherwise indicated. Dataset 206 contains two salient features such that feature 212 has a value of −1

(negative one) and feature 214 has a value of 1 (positive one). Dataset 208 contains, as salient features, the same feature 214 as dataset 206 and feature 216 having a value of 1 (positive one). Dataset 210 has the same salient features as dataset 206 (i.e., features 212 and 214). As such, feature 212 is contained in two of the datasets, feature 214 is contained in all three of the datasets, and feature 216 is contained in only one of the datasets.

As shown in panel 202, a stacked dataset 218 can be obtained by stacking the datasets 206, 208, and 210. Feature 220 in the stacked dataset 218 is a stacked representation of feature 212, feature 222 in the stacked dataset 218 is a stacked representation of feature 214, and feature 224 in the stacked dataset 218 is a stacked representation of feature 216. While all of the salient features of datasets 206, 208, and 210 are visible in the stacked dataset 218, the amplitude is decreased for salient features not contained in each and every one of the datasets 206, 208, and 210. More specifically, since feature 212 is contained in only two of the datasets, the corresponding feature 220 in the stacked dataset 218 has an amplitude of −2/3 (negative two-thirds), and since feature 216 is contained in only one of the datasets, the corresponding feature 224 in the stacked dataset 218 has an amplitude of 1/3 (positive one-third). Only feature 222 in the stacked dataset 218 preserves the amplitude of the corresponding feature 214 because the feature 214 is contained in all three of the datasets 206, 208, and 210.

In contrast to panel 202, panel 204 illustrates a fused dataset 226 obtained by fusing the datasets 206, 208, and 210 in accordance with exemplary embodiments. Feature 228 in the fused dataset 226 is a fused representation of feature 212, feature 230 in the fused dataset 226 is a fused representation of feature 214, and feature 232 in the fused dataset 226 is a fused representation of feature 216. Despite the fact that not all of the features 212, 214, and 216 are contained in each and every one of the datasets 206, 208, and 210, the respective amplitudes of the features 212, 214, and 216 are preserved in the fused dataset 226. That is, feature 228 in the fused dataset 226 has the same amplitude of feature 212, feature 230 in the fused dataset has the same amplitude of feature 214, and feature 232 in the fused dataset has the same amplitude of feature 216.

Referring again to FIG. 1, the transform module 114 may be further configured to transform the fused set of geophysical data from the transform parametric domain to a final parametric domain. In accordance with exemplary embodiments, the transform module 114 may transform the fused set of geophysical data such that after being transformed the fused set of geophysical data has data values for parameters of the transform parametric domain indexed by a final index that runs through the final parametric domain. The final index may be location within the geophysical space.

Figure 3:
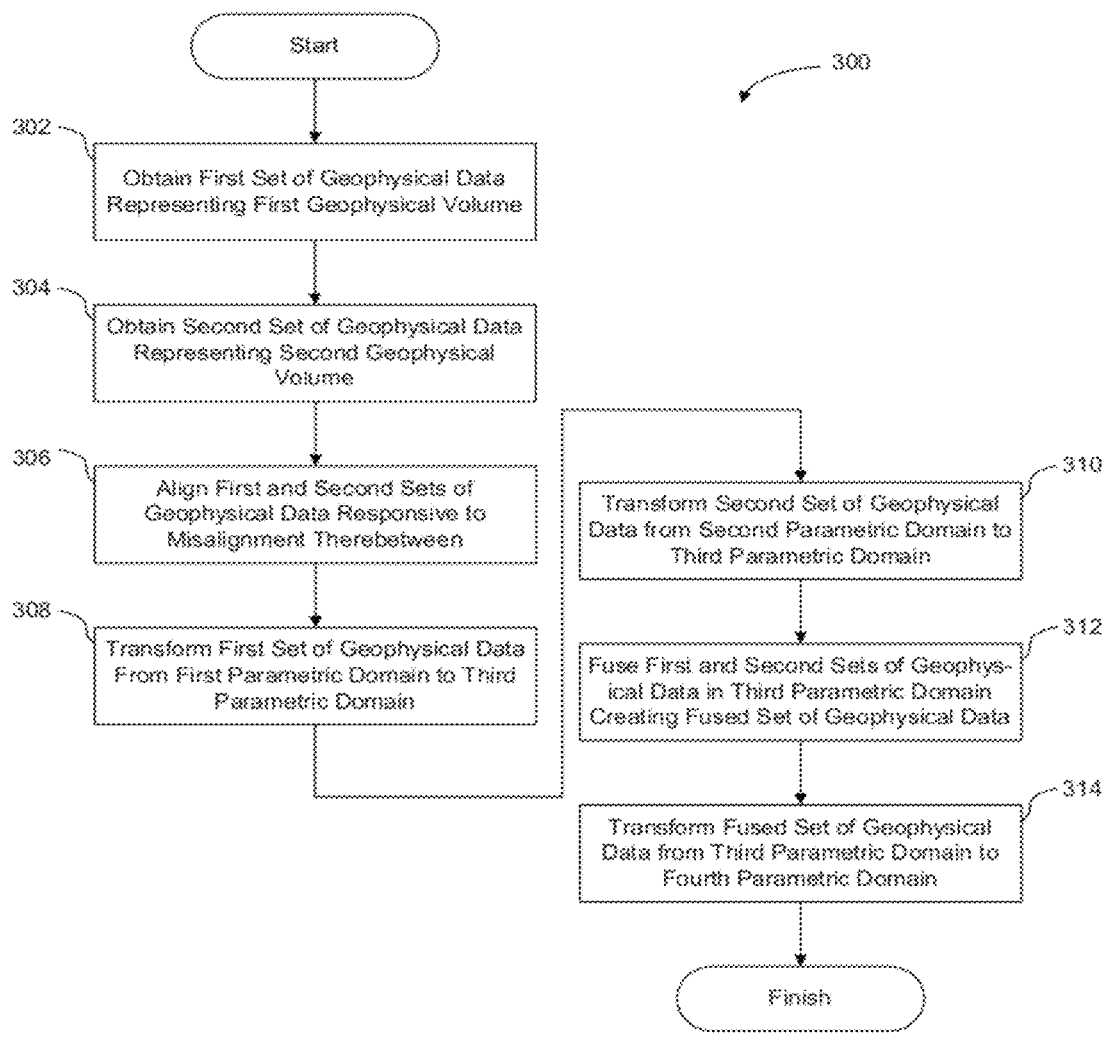
FIG. 3 illustrates a method of aggregating geophysical data representing at least first and second overlapping geophysical spaces, in accordance with one or more embodiments of the invention.

FIG. 3 illustrates a method 300 of aggregating geophysical data representing at least first and second overlapping geophysical space, in accordance with one or more embodiments of the invention. The operations of the method 300 presented below are intended to be illustrative. In some embodiments, the method 300 may be accomplished with one or more additional operations not described, and/or without one or more of the operations discussed. Additionally, the order in which the operations of the method 300 are illustrated in FIG. 3 and described below is not intended to be limiting.

In some embodiments, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 300 in response to instructions stored electronically on an electronic storage medium. The one or more processing devices may include one or more devices configured through hardware, firmware, and/or software to be specifically designed for execution of one or more of the operations of the method 300.

At an operation 302, a first set of geophysical data representing the first geophysical space is obtained. The first set of geophysical data may be obtained from a data storage system (e.g., the electronic storage 106) or other information source (e.g., the information resources 104). The first set of geophysical data may have data values for parameters of a first parametric domain that characterize the first geophysical space. The first parametric domain may be indexed by a first index that travels through the size of the first parametric domain. The first index may correspond to location in some embodiments. Operation 302 may be performed by execution of the data module 110 in exemplary embodiments.

At an operation 304, a second set of geophysical data representing the second geophysical space is obtained. The second set of geophysical data may be obtained from a data storage system (e.g., the electronic storage 106) or other information source (e.g., the information resources 104). The second set of geophysical data may have data values for parameters of a second parametric domain. The second parametric domain may be indexed by a second index that travels through the size of the second parametric domain. The second index may correspond to location in some embodiments. The second set of geophysical data may be separate and discrete from the first set of geophysical data. According to some embodiments, the data module 110 may be executed to perform operation 304.

It is noteworthy that the first set of geophysical data and the second set of geophysical data may include various data. For example, the first set of geophysical data may have been acquired using a different acquisition technique than the second set of geophysical data. In another example, the first set of geophysical data may represent a different aspect of the geophysical space than the second set of geophysical data. Aspects of the geophysical space may include, but are not limited to, velocity, reflectivity, and/or other aspects of the geophysical space. As yet another example, the first set of geophysical data may have been acquired at a time that is temporally distant from a time at which the second set of geophysical data was acquired. Furthermore, the first set of geophysical data may have been processed differently from processing of the second set of geophysical data prior to performance of any transforms. In some embodiments, the first set of geophysical data and/or the second set of geophysical data include a set of seismic data.

At an operation 306, alignment is performed between the first set of geophysical data and the second set of geophysical data responsive to misalignment between the first set of geophysical data and the second set of geophysical data. As discussed in connection with the registration module 112, misalignment may arise when corresponding corners of the first and second sets of geophysical data do not contain corresponding data, when the first and second sets of geophysical data are of different dimensions or scales, and/or when the first and second sets of geophysical data are otherwise misaligned. Operation 306 may include, for example, shifting, skewing, scaling, rotating, rubber-sheeting, and/or other processing techniques applied to the first set of geophysical data and/or the second set of geophysical data. The alignment performed in operation 306 may be based on amplitude and/ or phase of data contained in the sets of geophysical data. For example, the alignment may include correlating one or more corresponding salient features between the first and second sets of geophysical data. Such corresponding salient features may be determined based on the amplitude of data contained in the first and second sets of geophysical data at those salient features. According to some embodiments, operation 306 may be performed through execution of the registration module 112.

At an operation 308, the first set of geophysical data is transformed from the first parametric domain to a third parametric domain. The third domain may be indexed by a third index that travels through the size of the third parametric domain. The third index of the third parametric domain may be different from the first index of the first parametric domain and/or the second index of the second parametric domain. The transform module 114 may be executed to perform operation 308 in exemplary embodiments.

At an operation 310, the second set of geophysical data is transformed from the second parametric domain to the third parametric domain. It is noteworthy that the transforms performed in operation 308 and/or operation 310 may include a Fourier transform, a Radon transform, a wavelet transform, a curvelet transform, a wave atom transform, a bandelet transform, a beamlet transform, a contourlet transform, a directionlet transform, a edgelet transform, a seislet transform, a shearlet transform, a surfacelet transform, and/or any other transform, in accordance with various embodiments. The operation 310 may be performed through execution of the transform module 114 in some embodiments.

At an operation 312, the first set of geophysical data and the second set of geophysical data are fused in the third parametric domain to create a fused set of geophysical data. The fused set of geophysical data may specify data values for parameters of the third parametric domain for the third index of the third parametric domain. According to exemplary embodiments, the fusion module 116 may be executed to perform operation 312.

For a given index value included in the third index of the third parametric the performance of operation 312 may include selecting one of (i) the data value specified by the first set of geophysical data for a first parameter in the third parametric domain at the given index value, or (ii) the data value specified by the second set of geophysical data for the first parameter at the given index value. Such a selection may include using a selection rule. The selection rule may effectuate selection of the value with the greatest magnitude, the value with the greatest value, or a value based on another metric. A user selection and/or specification of the predetermined selection rule may be received such as via the user interface 102. Application of the predetermined selection rule may be responsive to the reception of such selection and/or specification. For the given index value included in the third index of the third parametric the performance of operation 312 may further comprise including the selected data value in the fused set of geophysical data as the data value for the first parameter at the given index value.

At an operation 314, the fused set of geophysical data is transformed from the third parametric domain to a fourth parametric domain. The fourth parametric domain may be indexed by location. According to exemplary embodiments, operation 314 may be performed via execution of the transform module 114.

Although not depicted in FIG. 3, the method 300 may further include processing of additional sets of geophysical data according to some embodiments. For example, one or more additional sets of geophysical data may be obtained, such as through execution of the data module 110. The one or more additional sets of geophysical data may represent, at least in part, a third geophysical space. The one or more additional sets of geophysical data may have data values for parameters in one or more corresponding initial parametric domains indexed by initial indices that run through the initial parametric domains. The one or more additional sets of geophysical data may be separate and discrete from the first set of geophysical data and the second set of geophysical data. The third geophysical space may include at least a portion of the portion of the second geophysical space that overlaps with the first geophysical space. The registration module 112 may be executed to align individual ones of the one or more additional sets of geophysical data with the first and second sets of geophysical data, responsive to misalignment between any of the one or more additional sets of geophysical data and the first and second sets of geophysical data. The one or more additional sets of geophysical data may be transformed to the third parametric domain, such as via execution of the transform module 114. As such, fusing the first set of geophysical data with the second set of geophysical data in the third parametric domain (see operation 312) may comprise fusing the one or more additional sets of geophysical data with the first set of geophysical data and the second set of geophysical data such that the fused set of geophysical data has data values for parameters of the third parametric domain for the third index of the third parametric domain.

Figure 4A:
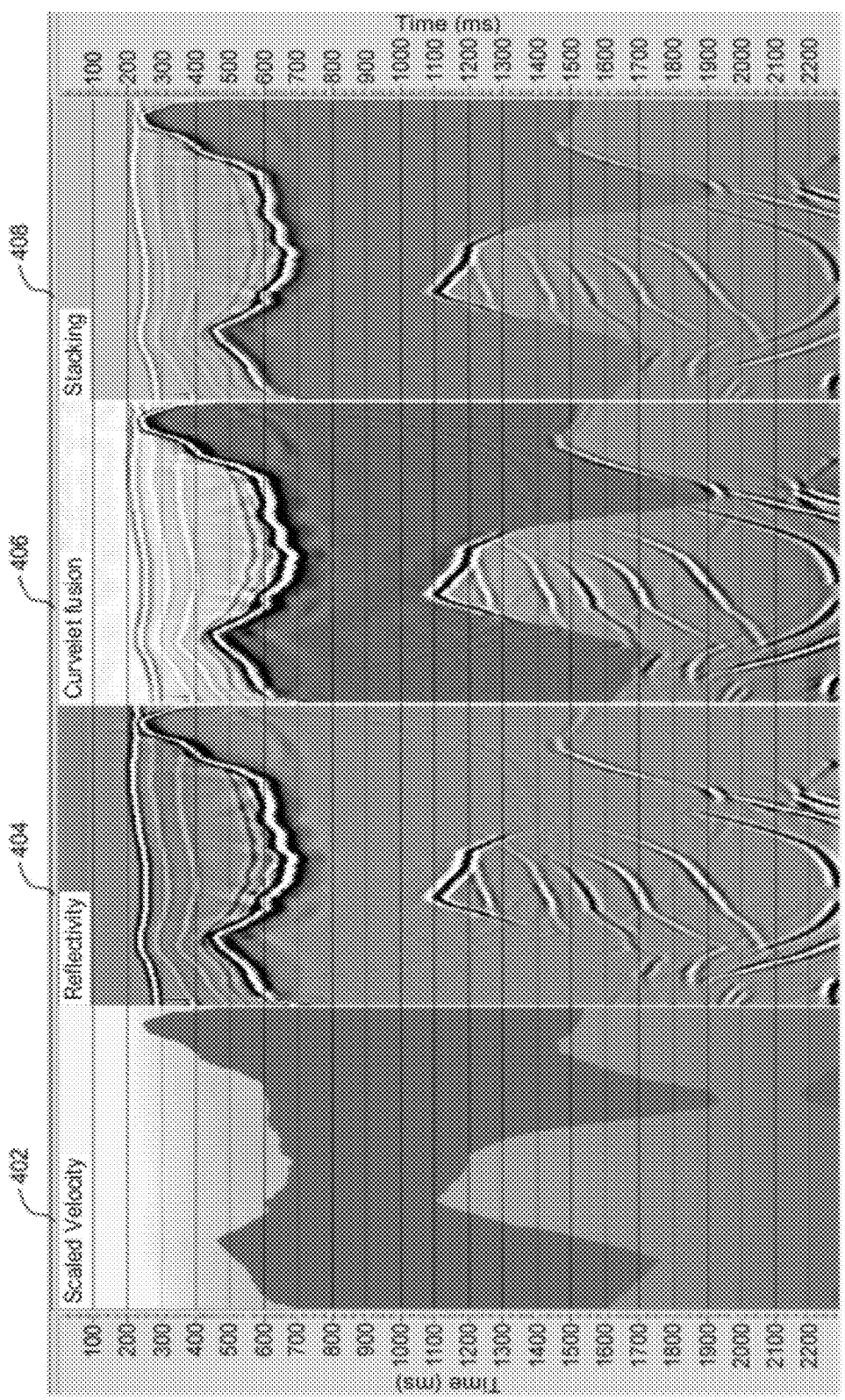
FIGS. 4A and 4B show exemplary comparisons between stacked datasets and datasets that have been fused by way of one or more embodiments of the present invention.
Figure 4B:
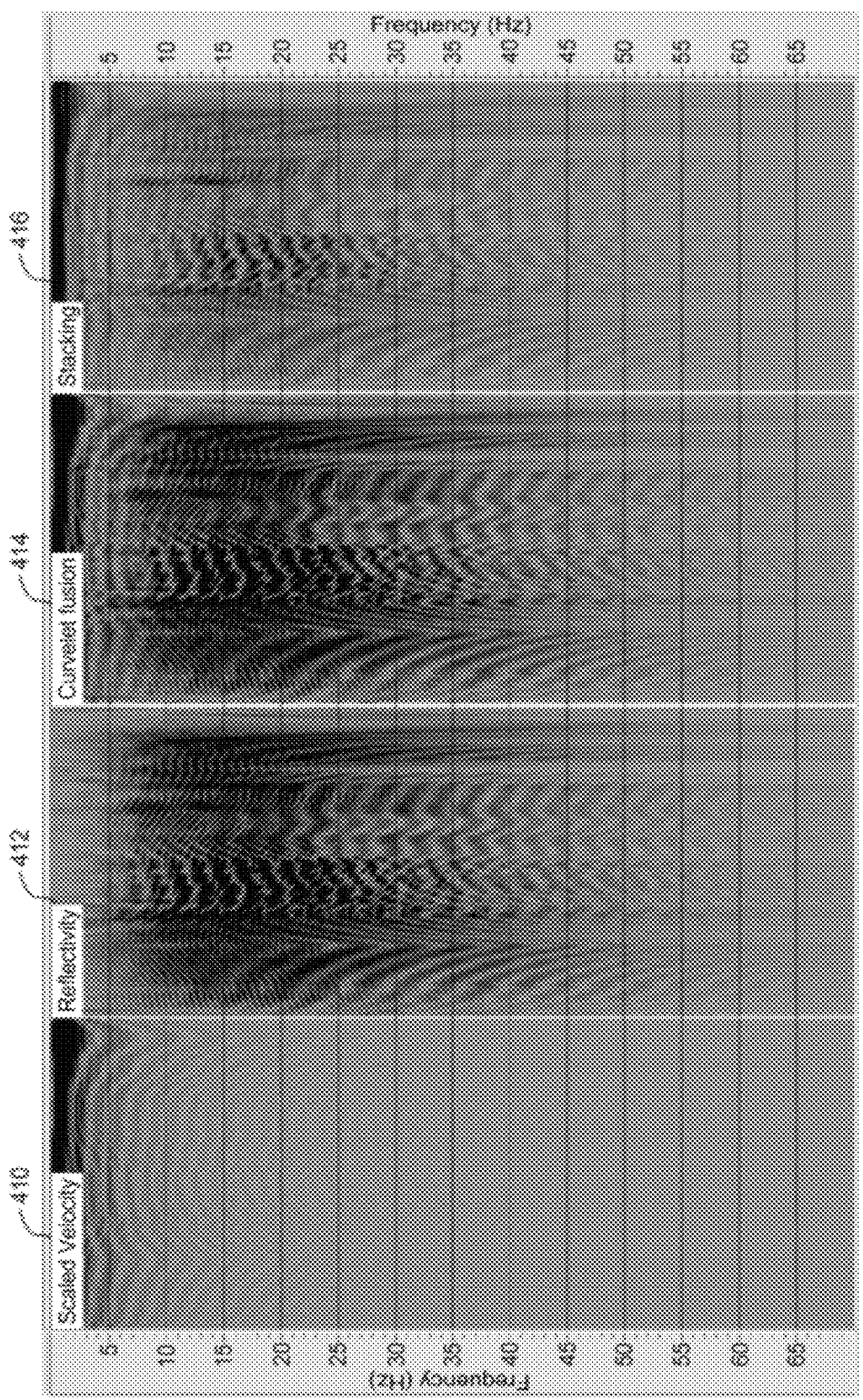

FIGS. 4A and 4B show exemplary comparisons between stacked datasets and datasets that have been fused by way of one or more embodiments of the present invention. FIG. 4A illustrates various datasets in the TX domain, where the vertical axis represents time and the horizontal axis represents spatial position. Panel 402 shows scaled velocity data for a given geological region, whereas panel 404 shows reflectivity data for the same geological region. Using an embodiment of the present invention, the scaled velocity data of panel 402 was fused with the reflectivity data of panel 406 to yield a fused dataset, which is shown in panel 406. The particular transform used to generate the fused dataset of panel 406 is a curvelet transform. Panel 408 shows a stacked dataset generated by summing the scaled velocity data of panel 402 with the reflectivity data of panel 406. Note that the amplitudes of salient features seen in panel 402 and panel 404 are preserved in the fused dataset of panel 406. In contrast, many of the salient features seen in panel 402 and panel 404 appear washed out or otherwise less accentuated in the stacked dataset of panel 408, relative to the fused dataset of panel 406.

Referring now to FIG. 4B, the same datasets of FIG. 4A are illustrated in the FX domain, where the vertical axis represents frequency and the horizontal axis represents spatial position. Panel 410 shows scaled velocity data for a given geological region, whereas panel 412 shows reflectivity data for the same geological region. Using an embodiment of the present invention, the scaled velocity data of panel 410 was fused with the reflectivity data of panel 412 to yield a fused dataset, which is shown in panel 414. The particular transform used to generate the fused dataset of panel 414 is a curvelet transform. Panel 416 shows a stacked dataset generated by summing the scaled velocity data of panel 410 with the reflectivity data of panel 412. Note that the amplitudes of salient features seen in panel 410 and panel 412 are preserved in the fused dataset of panel 414. In contrast, many of the salient features seen in panel 410 and panel 412 are less vivid or otherwise less accentuated in the stacked dataset of panel 416, relative to the fused dataset of panel 414.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of aggregating geophysical data representing at least first and second overlapping geophysical spaces, the method being implemented via one or more computer processors operatively linked with a computer readable medium encoded with instructions executable by the processor, the method comprising:

obtaining from a data storage system in communication with the computer processor a first set of geophysical data representing the first geophysical space, the first set of geophysical data having data values for parameters of a first parametric domain that characterize the first geophysical space, the first parametric domain being indexed by a first index that travels through the size of the first parametric domain;

obtaining, from the storage system, a second set of geophysical data representing the second geophysical space, the second set of geophysical data having data values for parameters of a second parametric domain, the second parametric domain being indexed by a second index that travels through the size of the second parametric domain, the second set of geophysical data further being separate and discrete from the first set of geophysical data;

transforming, via the executable instructions, the first set of geophysical data from the first parametric domain to a third parametric domain, the third domain being indexed by a third index that travels through the size of the third parametric domain, the third index of the third parametric domain being different from the first index of the first parametric domain and the second index of the second parametric domain;

transforming, via the executable instructions, the second set of geophysical data from the second parametric domain to the third parametric domain;

fusing, via the executable instructions, the first set of geophysical data with the second set of geophysical data in the third parametric domain to create a fused set of geophysical data that specifies data values for parameters of the third parametric domain for the third index of the third parametric domain, wherein for a given index value included in the third index of the third parametric the performance of the fusion of the first set of geophysical data with the second set of geophysical data comprises:

(a) selecting one of (i) the data value specified by the first set of geophysical data for a first parameter in the third parametric domain at the given index value, or (ii) the data value specified by the second set of geophysical data for the first parameter at the given index value; and (b) including the selected data value in the fused set of geophysical data as the data value for the first parameter at the given index value; and transforming, via the executable instructions, the fused set of geophysical data from the third parametric domain to a fourth parametric domain, the fourth parametric domain being indexed by location.

2. The method of claim 1, wherein operation (a) comprises using a selection rule.

3. The method of claim 2, further comprising receiving a user selection of the selection rule, and wherein application of the selection rule at operation (a) is responsive to the reception of such selection.

4. The method of claim 2, wherein the selection rule effectuates selection at operation (a) of the value with the greatest magnitude.

5. The method of claim 2, wherein the selection rule effectuates selection at operation (a) of the value with the greatest value.

6. The method of claim 1, wherein the first transform comprises one or more of a Fourier transform, a Radon transform, a wavelet transform, a curvelet transform, a wave atom transform, a bandelet transform, a beamlet transform, a contourlet transform, a directionlet transform, a edgelet transform, a seislet transform, a shearlet transform, or a surfacelet transform.

7. The method of claim 1, further comprising:

obtaining one or more additional sets of geophysical data representing, at least in part, a third geophysical space, the one or more additional sets of geophysical data having data values for parameters in one or more corresponding initial parametric domains indexed by initial indices that run through the initial parametric domains, the one or more additional sets of geophysical data being separate and discrete from the first set of geophysical data and the second set of geophysical data, the third geophysical space including at least a portion of the portion of the second geophysical space that overlaps with the first geophysical space; and transforming the one or more additional sets of geophysical data to the third parametric domain, wherein fusing the first set of geophysical data with the second set of geophysical data in the third parametric domain comprises fusing the one or more additional sets of geophysical data with the first set of geophysical data and the second set of geophysical data such that the fused set of geophysical data has data values for parameters of the third parametric domain for the third index of the third parametric domain.

8. The method of claim 1, wherein the first set of geophysical data has been acquired using a different acquisition technique than the second set of geophysical data.

9. The method of claim 1, wherein the first set of geophysical data has been processed prior to performance of the first transform differently from processing of the second set of geophysical data prior to performance of the second transform.

10. The method of claim 1, wherein the first set of geophysical data has been acquired at a time that is temporally distant from a time at which the second set of geophysical data was acquired.

11. The method of claim 1, wherein the first set of geophysical data is a set of seismic data.

12. The method of claim 1, wherein one or both of the first index and the second index is location.

13. A system configured to aggregate geophysical data representing a geophysical space, the system comprising:

one or more processors configured to execute computer program modules, the computer program modules comprising:

a data module configured to obtain sets of geophysical data representing a geophysical space from electronic storage, the sets of geophysical data being discrete from each other and provide separate representations of the geophysical space, a given set of geophysical data having data values for parameters of a corresponding initial parametric domain indexed by an initial index that travels over the size of the parametric domain corresponding to the given set of geophysical data;

a transform module configured to transform the individual sets of geophysical data from the initial parametric domains of the individual sets of geophysical data to a transform parametric domain such that after transformation of the given set of geophysical data, the given set of geophysical data has data values for parameters of the transform parametric domain indexed by a transform index that runs through the transform parametric domain;

a fusion module configured to fuse the sets of geophysical data in the transform parametric domain to create a fused set of geophysical data that has data values for parameters of the transform parametric domain for the index, wherein, responsive to the sets of geophysical data including a first set of geophysical data and a second set of geophysical data, the fusion module is configured to fuse the first set of geophysical data and the second set of geophysical data at a given index value in the index of the transform parametric domain by:

(a) selecting one of (i) the data value specified by the first set of geophysical data for a first parameter in the second parametric domain for the given index value, or (ii) the data value specified by the second set of geophysical data for the first parameter for the given index value; and (b) including the selected data value in the fused set of geophysical data as the data value for the first parameter for the given index value; and the transform module further being configured to transform the fused set of geophysical data from the transform parametric domain to a final parametric domain such that after being transformed the fused set of geophysical data has data values for parameters of the transform parametric domain indexed by a final index that runs through the final parametric domain.

14. The system of claim 13, wherein the fusion module is configured such that operation (a) includes using a selection rule.

15. The system of claim 14, further comprising a user interface configured to receive a user selection of the selection rule, the application of the selection rule at operation (a) being responsive to the reception of such selection.

16. The system of claim 14, wherein the selection rule effectuates selection at operation (a) of the value with the greatest magnitude.

17. The system of claim 14, wherein the selection rule effectuates selection at operation (a) of the value with the greatest value.

18. The system of claim 13, wherein the transform module is configured such that the first transform comprises one or more of a Fourier transform, a Radon transform, a wavelet transform, a curvelet transform, a wave atom transform, a bandelet transform, a beamlet transform, a contourlet transform, a directionlet transform, a edgelet transform, a seislet transform, a shearlet transform, or a surfacelet transform.

19. The system of claim 13, wherein the data module is configured to obtain sets of geophysical data that have been acquired using different acquisition techniques.

20. The system of claim 13, wherein the data module is configured to obtain sets of geophysical data that have been processed with different techniques prior to transformation.

21. The system of claim 13, wherein the data module is configured to obtain sets of geophysical data that have been acquired at different times.

22. The system of claim 13, wherein the data module is configured such that the sets of geophysical data include one or more sets of seismic data.

23. The system of claim 13, wherein the final index is location within the geophysical space.

* * * * *